United States Patent
Li et al.

(10) Patent No.: US 8,116,737 B2
(45) Date of Patent: Feb. 14, 2012

(54) METHOD, SYSTEM AND APPARATUS FOR LOCKING INFORMATION

(75) Inventors: Kepeng Li, Shenzhen (CN); Xiaoqian Chai, Shenzhen (CN); Xiaoyi Dong, Shenzhen (CN); Jiangshui He, Shenzhen (CN); Jiao Kang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 329 days.

(21) Appl. No.: 12/421,781

(22) Filed: Apr. 10, 2009

(65) Prior Publication Data

US 2009/0203356 A1    Aug. 13, 2009

Related U.S. Application Data

(63) Continuation of application No. PCT/CN2007/070591, filed on Aug. 30, 2007.

(30) Foreign Application Priority Data

Oct. 13, 2006    (CN) .......................... 2006 1 0131962

(51) Int. Cl.
*H04M 1/66* (2006.01)
(52) U.S. Cl. ...... 455/411; 455/410; 455/420; 455/456.4
(58) Field of Classification Search .................. 455/411, 455/410, 456.4, 420
See application file for complete search history.

(56) References Cited

U.S. PATENT DOCUMENTS

| | | | | |
|---|---|---|---|---|
| 5,809,413 A * | 9/1998 | Meche et al. | ................. | 455/411 |
| 6,138,005 A * | 10/2000 | Park | ............................... | 455/411 |
| 6,418,438 B1 * | 7/2002 | Campbell | ............................. | 1/1 |
| 7,107,349 B2 * | 9/2006 | Britt, Jr. | ......................... | 709/229 |
| 7,257,374 B1 * | 8/2007 | Creigh | ......................... | 455/41.2 |
| 7,505,758 B2 * | 3/2009 | Choi | ............................ | 455/411 |
| 7,509,130 B2 * | 3/2009 | Lee et al. | .................. | 455/456.1 |
| 7,711,352 B2 * | 5/2010 | Choi | ............................ | 455/410 |
| 7,783,307 B2 * | 8/2010 | Hovestadt | ..................... | 455/411 |
| 2005/0183138 A1 * | 8/2005 | Phillips et al. | .................. | 726/11 |
| 2005/0186954 A1 * | 8/2005 | Kenney | ........................ | 455/420 |
| 2008/0104207 A1 * | 5/2008 | Pulkkinen et al. | ............ | 709/220 |

FOREIGN PATENT DOCUMENTS

| | | |
|---|---|---|
| CN | 1525749 A | 9/2004 |
| CN | 1655643 A | 8/2005 |
| CN | 1810052 A | 7/2006 |
| EP | 1 515 571 A2 | 3/2005 |

(Continued)

OTHER PUBLICATIONS

European Search Report (Mar. 4, 2010).

(Continued)

*Primary Examiner* — Jinsong Hu
*Assistant Examiner* — Qun Shen
(74) *Attorney, Agent, or Firm* — Leydig, Voit & Mayer, Ltd.

(57) ABSTRACT

In embodiments of the invention, there is provided with a method, system, and apparatus for locking information. Specifically, a server sends a lock message carrying lock object information to a mobile terminal; the mobile terminal locks a lock object according to the lock message, the lock object corresponding to the lock object information. With the solutions provided in the embodiments of the invention, a server may lock information for a mobile terminal, so as to prevent other servers from manipulating the information.

15 Claims, 7 Drawing Sheets

FOREIGN PATENT DOCUMENTS

| | | |
|---|---|---|
| EP | 1 705 872 A2 | 9/2006 |
| JP | 2002-118876 A | 4/2002 |
| JP | 2002-0077372 A | 9/2003 |
| JP | 2004-297156 A | 10/2004 |
| JP | 2005-277764 A | 10/2005 |
| KR | 100423403 B1 | 3/2004 |
| WO | WO 2004/114698 A1 | 12/2004 |

OTHER PUBLICATIONS

"Device Management Architecture," Draft Version x.y—May 30, 2005, *Open Mobile Alliance*, OMA-AD_DM-V1_0-20050530-D (2005) (XP-002433524).

"OMA Device Management Standardized Objects," Candidate Version 1.2—Jun. 7, 2005, Open Mobile Alliance, OMA-TS-DM-StdObj-V1_2-220050607-C (2005) (XP-002436375).

"OMA-DM Lock-And-Wipe—MO-WID," OMA Work Item Document, XP-002569896, retrieved from the Internet: URL:http://member.openmobilealliance.org/ftp/Public_documents/DM/2006/OMA-DM-2006-0138R08-INP_New_WID_Lock_and_Wipe_MO.zip> paragraph [001.] (Sep. 20, 2006).

Office Action in corresponding Korean Application No. 20090078826 (Nov. 15, 2005).

Rejection Decision in corresponding Japanese Application No. 2009-531711 (Aug. 2, 2011).

1st Office Action in corresponding Chinese Application No. 200610131962.6 (Feb. 17, 2011).

Written Opinion of the International Searching Authority in corresponding PCT Application No. PCT/CN2007/070591 (Dec. 6, 2007).

"Look and Feel Customization Requirements," Sep. 14, 2006, Draft Version 1.0, Open Mobile Alliance, San Diego, California.

"Device Capability Management Object Requirements," Oct. 4, 2006, Draft Version 1.0, Open Mobile Alliance, San Diego, California.

"OMA Device Management Protocol," Jan. 25, 2005, Draft Version 1.2, Open Mobile Alliance, San Diego, California.

* cited by examiner

METHOD, SYSTEM AND APPARATUS FOR LOCKING INFORMATION

CROSS-REFERENCE TO RELATED APPLICATIONS

This application is a continuation of International Patent Application No. PCT/CN2007/070591, filed Aug. 30, 2007, which claims priority to pending Chinese Patent Application No. 200610131962.6, filed Oct. 13, 2006, both of which are hereby incorporated by reference in their entirety.

FIELD OF THE INVENTION

The invention relates to techniques for a server to manage a mobile terminal, and more particularly, to a method, system, and apparatus for locking information.

BACKGROUND

A mobile terminal is an important constituent element for a system of mobile operating services, and includes a large amount of information, which is typically classified into capability information, appearance information and user personal data information. The capability information indicates a service capability that the mobile terminal possesses, for example, network capability, hardware capability, software capability and so on. The appearance information is the appearance that the mobile terminal presents to the user, for example, screensaver, desktop, wallpaper, menu, homepage, picture, ringtone and so on. The user personal data information is the personal privacy information saved in the mobile terminal by the user, for example, the address list, short messages, schedule, and task list, etc.

A server having management capability may manage information of the mobile terminal. For example, a Device Management Server (DMS) having Device Management (DM) capability may manipulate the mobile terminal Over The Air (OTA), for example, parameter setting, firmware updating, software downloading, installation, and deletion, etc. For another example, a Look and Feel Customization (LFC) Management Server having appearance management capability may manage the appearance of a mobile terminal, e.g., distributing, installing, updating, deleting, activating, de-activating an appearance package or an appearance element, and so on.

When a server performs management operation on a mobile terminal, the mobile terminal has a DM tree. The DM tree has several nodes, each being a basic Management Object (MO) that the sever may manipulate. With the management operations on these basic Management Objects, the server may manage various information of the mobile terminal.

In other words, when the server manages the information of the mobile terminal, the server may issue a management command to the mobile terminal, the management command being directed to a node in the DM tree. The mobile terminal then executes the received management command so as to achieve the purpose of managing the information of the mobile terminal. Here, the management command may be a Replace command, an Execution command, a Copy command, a Delete command, or the like.

The server having management capability may be a server of an operator, or a server of an enterprise manager or the like. In other words, any server having management capability may manage the same mobile terminal. For example, both the first and second servers may manage a mobile terminal. At a certain point in time, the first server may disable the USB hardware capability of the mobile terminal; and afterwards, the second server may enable the USB hardware capability of the mobile terminal.

In practical applications, when a server sends a management command to a mobile terminal, it is very likely that the server does not want its managed mobile terminal to be changed by other servers. For example, after disabling the USB hardware capability of the mobile terminal, the first server may want to keep the USB hardware capability of the mobile terminal disabled so that the second server cannot enable the USB hardware capability of the mobile terminal. In the conventional art, however, any server having management capability may manage the mobile terminal, and accordingly the above requirements cannot be satisfied by the conventional art.

SUMMARY

In view of the above facts, embodiments of the invention have three objects.

The first object of the invention is to provide a method for locking information so that information of a terminal may be locked to avoid chaotic operations.

The second object of the invention is to provide an apparatus for locking information so that information of a terminal may be locked to avoid chaotic operations, the apparatus being a mobile terminal.

The third object of the invention is to provide an apparatus for locking information so that information of a terminal may be locked to avoid chaotic operations, the apparatus being a server.

For the first object of the invention, a technical solution provided in an embodiment of the invention is a method for locking information, including: (1) receiving, by a mobile terminal, a lock message carrying lock object information sent from a server; and (2) locking, by the mobile terminal, a lock object according to the lock message, the lock object corresponding to the lock object information.

For the second object of the invention, a technical solution provided in an embodiment of the invention is an apparatus for locking information, the apparatus being a mobile terminal, the mobile terminal at least including a locking unit configured to receive a lock message and to lock a lock object.

For the third object of the invention, a technical solution provided in an embodiment of the invention is an apparatus for locking information, the apparatus being a server, the server at least including a transmitting unit configured to transmit a lock message carrying lock object information to a mobile terminal.

As noted above, a method and apparatus for locking information is provided in embodiments of the invention. A server sends a lock message to a mobile terminal; the mobile terminal then locks a lock object according to the lock message. In this manner, other servers are prevented from manipulating the lock object, and accordingly the practical requirements are met.

DETAILED DESCRIPTION

The objects, technical solutions, and advantages relating to the embodiments of the invention will be more fully understood when considered with respect to the following detailed description to the embodiments of the invention taken in conjunction with the accompanying drawings.

Figure 1:
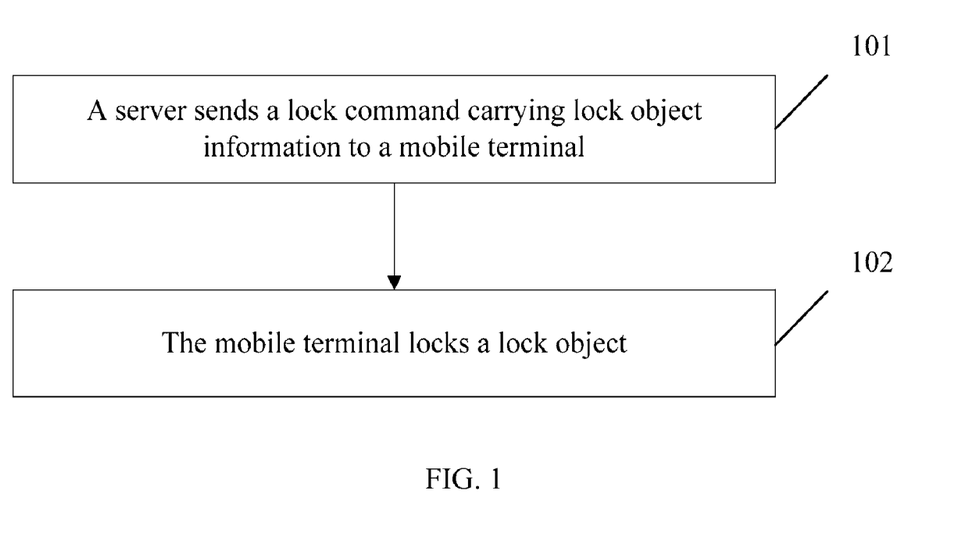
FIG. 1 is a flow chart showing a method for locking information according to the invention.

FIG. 1 is a flow chart showing the method of the invention according to a first embodiment. As shown in FIG. 1, the present embodiment of the invention is intended to lock the information of a mobile terminal, and the following steps are involved.

At step 101, a server sends a lock message carrying lock object information to a mobile terminal.

Here, the server is one having management capability over the mobile terminal. The server may be a Device Management Server (DMS) or a Look and Feel Customization (LFC) Management Server, or any other server having management capability over the mobile terminal.

At step 102, the mobile terminal locks a lock object according to the lock message, the lock object being one corresponding to the lock object information.

If locking is performed by modifying the attribute information of the lock object, there may be five methods to implement locking according to various embodiments of the invention. The first method is an executable node based method; the second method is an indication node based method; the third method is a tag based method; the fourth method is a read/write attribute based method; and the fifth method is a lock attribute based method.

The executable node based method is such a method that a Lock node which is an executable node in nature is set in a Device Management tree. The Lock node may be triggered by a lock message so as to initiate or trigger the locking of a lock object.

Here, the executable node may have a meaning same as the executable node in the Device Management (DM) protocol, that is, a node that may be triggered to perform a specific function. In practical applications, a specific function is generally not performed by the executable node itself. Instead, the executable node is associated with a program for performing a specific function to trigger the executable node.

In this regard, to trigger the executable node, the lock message as set forth in step 101 includes lock object information, as well as information for triggering the Lock node. The information for triggering the Lock node may be an executable command for the Lock node, for example, an executable command similar to <Exec> . . . </Exec> in the DM protocol.

The indication node based method is such that a Lock node which is an indication node in nature is set in the Device Management tree and the mobile terminal detects the Lock node in real time. When detecting that indication information is recorded in the Lock node, the lock object is locked. In other words, the lock message in step 101 includes lock object information, as well as lock indication information. When a lock message is received by the mobile terminal, the lock indication information is recorded in the Lock node. In this manner, the mobile terminal may detect that the content in the Lock node is lock indication information and then locks the lock object.

The tag based method is such a method that no change is made to the Device Management tree itself and locking is performed by using a tag command directly. In other words, a tag command may be extended for initiating lock, and when the mobile terminal receives the tag command, locking of the lock object may be initiated.

In the above three locking methods, the lock message may also carry a lock mode, for example, Exclusive-Lock, Read-Lock, Write-Lock, Operation-Lock or the like.

The Exclusive-Lock refers to that the server sending the lock message has an exclusive right over the operation of the lock object. In other words, after a server locks the terminal information, the server may perform an exclusive management operation on the terminal information corresponding to the lock object. In this case, only the above-mentioned server can manipulate the locked terminal information, and other servers cannot access the locked terminal information. After the management operation is completed, the server may issue an unlock command so as to release the locking of the terminal information. Afterwards, other server may manipulate the terminal information. Such a locking may prevent chaos caused by multiple servers performing different management operations.

The Read-Lock refers to that a read operation is not allowed. In other words, after a server locks the terminal information, other servers are not allowed to read the terminal information corresponding to the lock object. In practical operations, the Read-Lock may be implemented by modifying the attribute. A detailed description will be made below to introduce how to implement the Read-Lock by modifying the attribute.

The Write-Lock refers to that a write operation is not allowed. In other words, after a server locks the terminal information, other servers are not allowed to modify or delete the terminal information corresponding to the lock object. In practical operations, the Write-Lock may also be implemented by modifying the attribute information.

The Operation-Lock refers to that the management operation is not allowed to be triggered. In other words, after a server locks the terminal information, other servers are not allowed to manipulate the locked terminal information. The operations include Install, Update, Remove, Enable/Disable, Activate/Deactivate, or the like. In practical operations, the Operation-Lock may also be implemented by modifying the attribute information.

Practically, if there is only one fixed type of lock mode, there is no need to carry lock mode in the lock message.

In the present embodiment, the lock object information may include the path information about the destination node and the lock granularity. The path information about the destination node may indicate a node associated with the lock object in the DM tree. The lock granularity may be Device-Lock, Component-Lock, Subtree-Lock or Node-Lock. According to the path information about the destination node and the lock granularity, the lock object may be specified.

Device lock refers to locking the whole terminal and the functions of the terminal will be shielded. The extent of locking the terminal may be specified by the lock level information carried in the lock message. The lock level information may be classified into full lock and partial lock. Full lock refers to that other functions of the mobile terminal are not available except dialing an emergency call or establishing a session with a specific server. Partial lock refers to that other functions of the mobile terminal are not available except answering an incoming call, dialing an emergency call or establish session with a specific server. As to which functions of the full lock and the partial lock are possessed by the mobile terminal, it may be determined autonomously by a user when the solution of the embodiment is applied, and the detailed description is omitted here.

In addition, instead of classifying the lock level information according to the full lock and the partial lock, the lock level information may be classified into low-level lock, middle-level lock or high-level lock. In the case of low-level lock, other functions of the mobile terminal are not available except answering an incoming call, dialing an emergency call or establishing a session with a specific server. In the case of middle-level lock, other functions of the mobile terminal are not available except dialing an emergency call or establishing a session with a specific server. In the case of high-level lock, other functions of the mobile terminal are not available except establishing a session with a specific server. As to which functions under the low-level lock, the middle-level lock and the high-level lock may be possessed by the mobile terminal, it may be determined autonomously by a user when the solution of the embodiment is applied, and the detailed description is omitted here.

Component lock refers to locking a whole node, not only including locking nodes associated with the component in the DM tree, but also including locking other functions associated with the component outside the DM tree. For example, the Camera capability component not only includes nodes associated with the Camera capability in the DM tree (generally, sub-nodes of the Camera node), but also includes other functions, such as drivers or coders outside the DM tree associated with the Camera capability. When the Camera capability component is to be locked, the Camera node and its sub-nodes in the DM tree, as well as other functions, such as drivers or coders outside the DM tree associated with the Camera capability, are to be locked.

Sub-tree lock refers to locking a sub-tree in the DM tree. For example, there is a screensaver management sub-tree in the DM tree, for storing all screensaver information. The server may lock the screensaver management sub-tree via the lock message so that all screensaver information is locked.

Node lock refers to locking a node in the DM tree. For example, there is a management sub-tree in the DM tree, for managing the user's personal data, such as contact information. The management sub-tree includes a Description node, an Indication node, a Data node, a Status node and the like. If the contact information is to be locked, only the Data node needs to be locked, and there is no meaning to lock other nodes such as the Description node, the Indication node, the Status node or the like. In this case, if the server locks the Data node via a lock message, other servers may be prevented from performing operations on the contact information, such as access or modification.

Alternatively, other lock granularities may be defined in practical applications, as long as a negotiation is reached in advance between the server and the mobile terminal. For example, the lock granularity may include Package-Lock, Element-Lock or the like. The Package-Lock refers to locking a certain package, such as an LFC Package. The Element-Lock refers to locking a certain element, such as an element in the LFC Package. Here, the LFC Package generally includes several elements, such as screensaver, ringtone, picture or the like.

In other words, the lock message sent from the server to the mobile terminal includes a lock granularity such as a Package-Lock or an Element-Lock with the lock mode being Operation-Lock. In this manner, when the mobile terminal receives the lock message, a locking is performed according to the lock granularity and the lock mode, that is, to lock the package or the element. Afterwards, for example, after the LFC Package is locked by a server, the LFC Package will not be changed via the operation of another server. In other words, if an element such as the screensaver of the LFC Package in the mobile terminal is locked by a server, the screensaver of the mobile terminal may not be changed via the operation of another server.

In the above three locking methods, when a lock message is received by a mobile terminal, both the lock mode and the lock granularity may be recorded. Then, the attribute information of the lock object may be modified according to the recorded lock mode and lock granularity.

Here, modification of the attribute information may involve modification of the Access Control List (ACL) attribute information or the system attribute information. The ACL attribute is used to indicate the operation right of a server over the management tree node of a mobile terminal, typically including: Get, Replace, Copy, Exec, Delete or the like. For example, if a node is allowed to be read by the first server Server1 and the second server Server2, the ACL attribute of the node may be denoted by Get=Server1& Get=Server2. At this point, if the first server sends a lock message for the node, and the lock mode is Read-Lock, that is, the node is not allowed to be read, Get=Server1& Get=Server2 may be removed directly, so as to achieve the purpose of Read-Lock. Another example, if a node may be read and modified by the first server Server1 and the second server Server2, the ACL attribute of the node may be denoted by Get=Server1& Get=Server2 & Replace=Server1& Replace=Server2. At this point, if the first server sends a lock message for the node, and the lock mode is Write-Lock, that is, the node is not allowed to be modified, Replace=Server1& Replace=Server2 may be removed directly, so as to achieve the purpose of Write-Lock. For still another example, a node may be executed by the first server Server1 and the second server Server2. At this point, if the first server sends a lock message for the node, and the lock mode is Operation-Lock, the Exec right may be removed from the ACL attribute of the node, so as to achieve the purpose of Operation-Lock.

The system attribute refers to the attribute maintained by the underlying layer of the mobile terminal. In other words, the data information of the lock object is not within the node of the Device Management tree, but resides in the mobile terminal in the form of a file or a record in a database, and the node is associated with the file or the record in the database. When the node is to be locked, the node may determine the corresponding file or record in the database via the association relationship, and the attribute of the file or record in the database may then be modified, so as to achieve the purpose of locking. As to how to modify the file or record in the database, it belongs to conventional art and detailed description is omitted here.

In the fourth method for locking, that is, in the read/write attribute based method, a read/write attribute may be added for a node in the DM tree. A server sends a lock message carrying lock object information and a read/write attribute value to a mobile terminal. The mobile terminal modifies the read/write attribute of the lock object directly based on the read/write attribute value. The read/write attribute of the lock object is modified to the read/write attribute value in the lock message.

Here, the read/write attribute may be read only or hidden. When the read/write attribute is read-only, only read is allowed, and modification or write is not allowed. When the read/write attribute is hidden, read is not allowed. Practically, in the case where the read/write attribute is hidden and read is not allowed, modification or write will be not allowed accordingly. In practical applications, other read/write attributes may be defined as long as the server and the mobile terminal have reached a consensus in advance. For example, a document attribute may be set, indicating that both read and write are allowed, which is often set during unlocking.

In the fifth method for locking, that is, in the lock attribute based method, a lock attribute may be added for a node in the DM tree. A server sends a lock message carrying lock object information and a lock attribute value to a mobile terminal. The mobile terminal modifies the lock attribute of the lock object directly based on the lock attribute value. The lock attribute of the lock object is modified to the lock attribute value in the lock message.

To better illustrate the solutions in the embodiments of the invention, detailed descriptions will be given below to several preferred embodiments.

Embodiment 2

Figure 2:
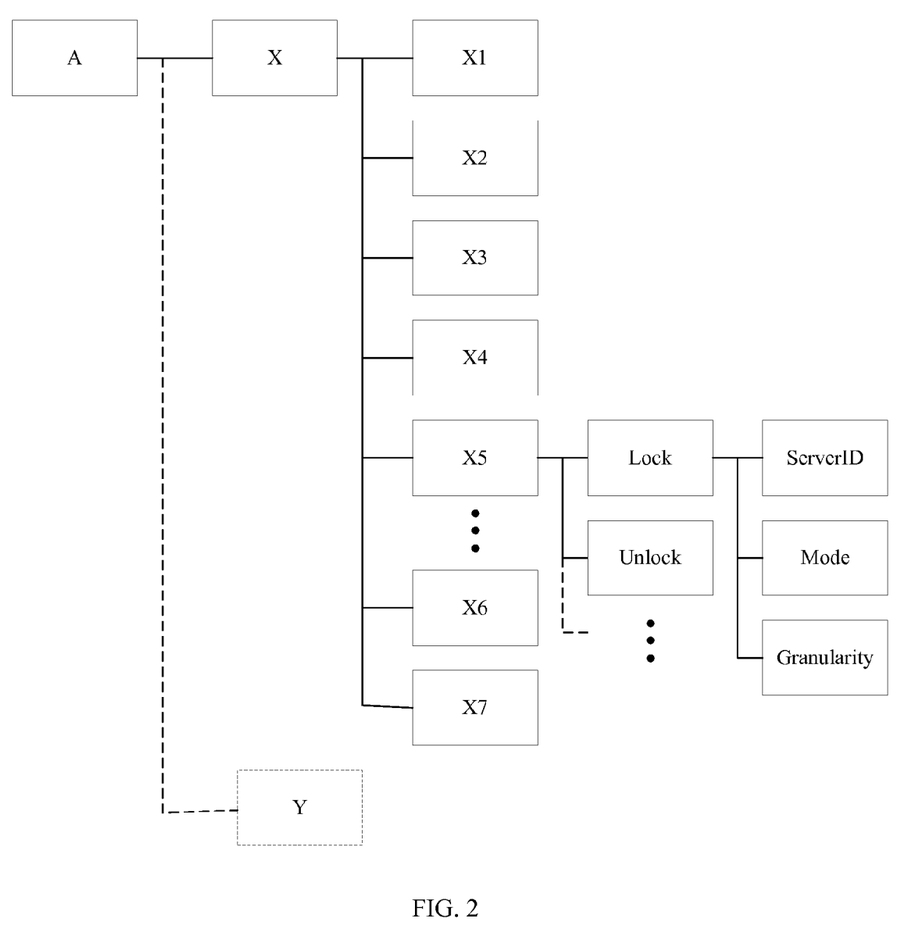
FIG. 2 illustrates the configuration of an abstract Device Management tree according to a first embodiment.
Figure 3:
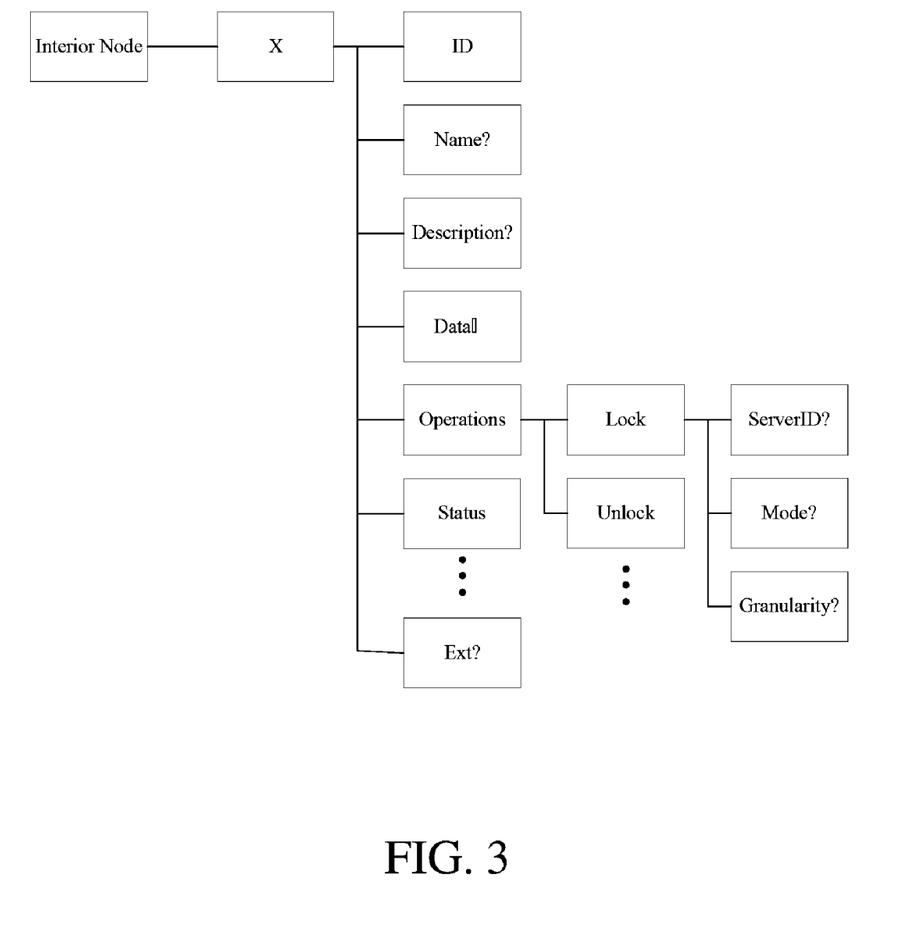
FIG. 3 illustrates the configuration of a specific Device Management tree according to the first embodiment.

FIG. 2 illustrates the configuration of a Device Management tree for a mobile terminal. As shown in FIG. 2, the Device Management tree includes node A, node X, node Y, and nodes X1~X7. The management tree is also provided with a lock node Lock, an unlock node Unlock, a server ID node ServerID, a lock mode node Mode, and a lock granularity node Granularity. For ease of illustration, the nodes in the DM tree are abstracted as node A, node X, nodes X1~X7, and node Y. In practical applications, the configuration of the DM tree and the specific nodes may be determined by the user in the embodiment, as long as the server and the mobile terminal have reached a consensus in advance. As shown in FIG. 3, node A is an Interior Node, and nodes X1~X7 are nodes of ID, Name, Description, Data, Operations, Status or the like. The definitions of these nodes are the same as in the conventional art, and detailed description is omitted here. The question mark "?" indicates that the number of nodes may be 1 or 0, that is, a node may be present or absent. In practical applications, the Interior Node in FIG. 3 may be a Device Capability Management Object (DCMO) node, and node X may be a Universal Serial Bus (USB) node, representing a component associated with the USB hardware capability.

Furthermore, ServerID, Mode and Granularity in the present embodiment, as sub-nodes of the node X5, are used to record the server ID, the lock mode and the lock granularity. In practical applications, instead of setting ServerID, Mode and Granularity in the DM tree, the server ID, the lock mode and the lock granularity may be stored in a storage unit of the mobile terminal.

In the present embodiment, both the Lock node and the Unlock node are executable nodes, and may be locked with the executable node based method.

Similar to descriptions of other nodes in the DM tree according to the DM protocol, the description of the Lock node in the embodiment is shown in Table 1.

TABLE 1

| Node: X/X5/Lock | | |
| --- | --- | --- |
| Tree Occurrence | Format | Min. Access Types |
| 1 (One) | Node | Get, Exec |

The description of the ServerID node is shown in Table 2.

TABLE 2

| Node: X/X5/Lock/ServerID | | |
| --- | --- | --- |
| Tree Occurrence | Format | Min. Access Types |
| 0 or 1 (Zero Or One) | Character | Get |

The description of the Mode node is shown in Table 3.

TABLE 3

| Node: X/X5/Lock/Mode | | |
| --- | --- | --- |
| Tree Occurrence | Format | Min. Access Types |
| 0 or 1 (Zero Or One) | Character | Get |

The value of the Mode node may be Exclusive-Lock, Read-Lock, Write-Lock or Exec-Lock, and the descriptions are shown in Table 4.

TABLE 4

| Value | Description |
| --- | --- |
| ServerID-Only | Exclusive Lock, any operation from another server is not allowed |
| Read-Lock | Read-Lock, reading or copying is not allowed |
| Write-Lock | Write-Lock, addition, modification or deletion is not allowed |
| Exec-Lock | Exec-Lock, any management operation is not allowed, such as Enable, Disable or the like |

The description of the Granularity node is shown in Table 5.

TABLE 5

| Node: X/X5/Lock/Granularity | | |
| --- | --- | --- |
| Tree Occurrence | Format | Min. Access Types |
| 0 or 1 (Zero Or One) | Character | Get |

The value of the Granularity node may be Device-Lock, Component-Lock, Sub-tree-Lock or Node-Lock, and the descriptions are shown in Table 6.

TABLE 6

| Value | Description |
| --- | --- |
| Device | The whole device is locked |
| Component | The whole component is locked |
| Sub-tree | A sub-tree is locked |
| Data | A node is locked |

The description of the Unlock node is shown in Table 7.

TABLE 7

| Node: X/X5/Lock/Unlock | | |
| --- | --- | --- |
| Tree Occurrence | Format | Min. Access Types |
| 1 (One) | Node | Get, Exec |

Figure 4:
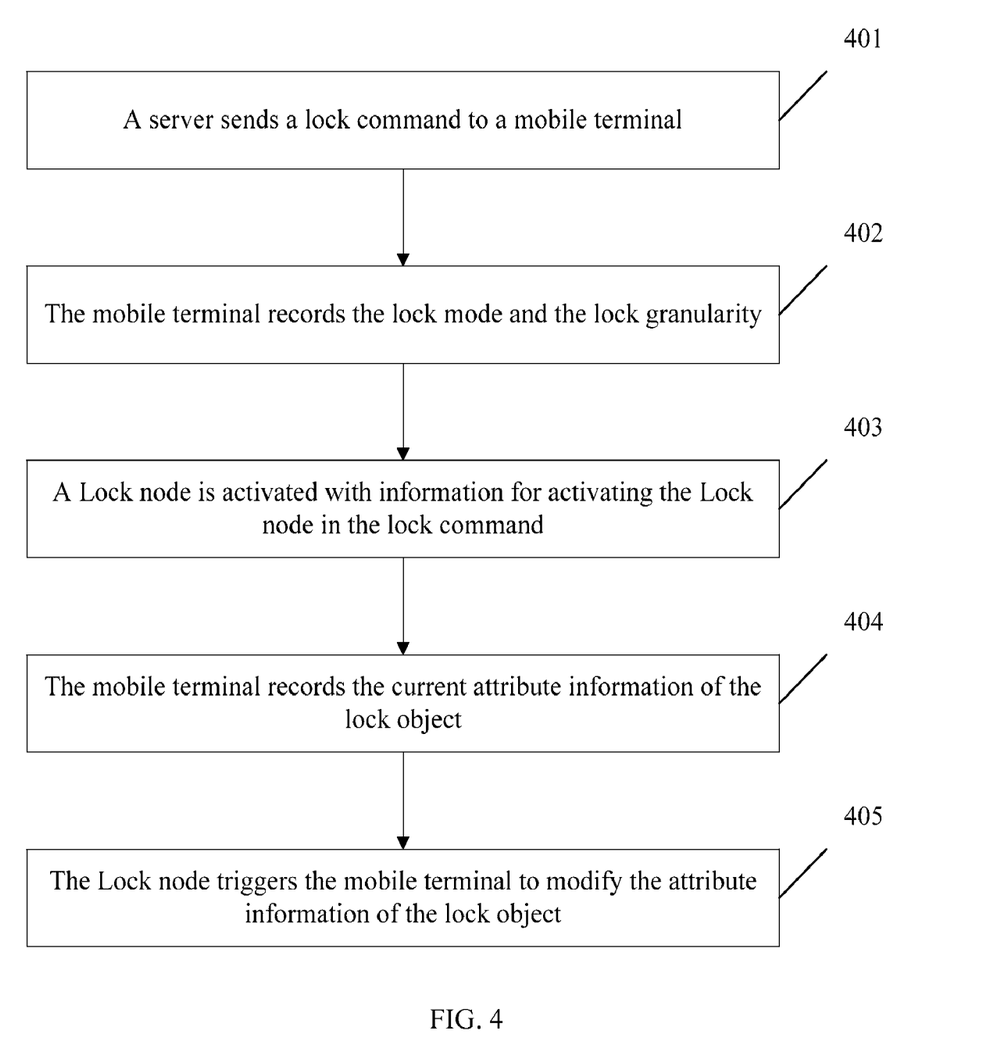
FIG. 4 is a flow chart according to the first embodiment.

FIG. 4 is a flow chart according to the second embodiment. As shown in FIG. 4, the embodiment includes the following steps.

At step 401, a server sends a lock message to a mobile terminal, the lock message including information for triggering a Lock node, a lock mode and lock object information. Here, the lock object information may include path information about the destination node and the lock granularity.

In practical applications, the format for the lock message in form of an executable node may be generally as follows.

```
<Replace>
    <CmdID>1</CmdID>
    <Item>
        <Target>
            <LocURI>./A/X/X5/Lock/Mode</LocURI>
        </Target>
        <Data>Read-Lock</Data>
    </Item>
</Replace>
<Replace>
    <CmdID>2</CmdID>
    <Item>
        <Target>
            <LocURI>./A/X/X5/Lock/Granularity</LocURI>
        </Target>
        <Data>Component<Data>
    </Item>
</Replace>
<Exec>
    <CmdID>3</CmdID>
    <Item>
        <Target>
            <LocURI>./A/X/X5/Lock</LocURI>
        </Target>
    </Item>
</Exec>
```

Here, "<LocURI>./A/X/X5/Lock/Mode</LocURI>" and "<Data>Read-Lock</Data>" may indicate that the lock mode is Read-Lock, "<LocURI>./A/X/X5/Lock/Granularity</LocURI>" and "<Data>Component<Data>" may indicate that the lock granularity is Component-Lock, "<Exec> . . . </Exec>" may indicate information for triggering a Lock node, and "./A/X" may indicate path information about the destination node. Alternatively, commands in form of other formats may be used in practical applications as long as they may be identified by the mobile terminal.

At step 402, the mobile terminal records the lock mode and the lock granularity.

In the present embodiment, because nodes are specifically set in the DM tree to record the lock mode and the lock granularity, the lock mode may be recorded in the Mode node and the lock granularity may be recorded in the Granularity node.

At step 403, the Lock node is triggered by the information for triggering the Lock node in the lock message.

In the present embodiment, the information for triggering the Lock node is the Exec command in step 401, that is:

```
<Exec>
    <CmdID>3</CmdID>
    <Item>
        <Target>
            <LocURI>./A/X/X5/Lock</LocURI>
        </Target>
    </Item>
</Exec>
```

At step 404, the mobile terminal records the current attribute information of the lock object.

At step 405, the Lock node triggers the mobile terminal to modify the attribute information of the lock object. The mobile terminal modifies the attribute information of the lock object according to the recorded lock mode and lock granularity.

The attribute information may be ACL attribute information or system attribute information. As to the modification, it depends on specific lock mode and lock granularity, and no detailed description is made here.

In addition, the lock message may also carry a server ID. After locking, the mobile terminal may record the server ID. When unlocking is desired, a server sends an unlock command to the mobile terminal, and the unlock command carries a server ID and information about the unlock object. The format of the unlock command may be as follows.

```
<Exec>
    <CmdID>4</CmdID>
    <Item>
        <Target>
            <LocURI>./A/X/X5/Unlock</LocURI>
        </Target>
    </Item>
</Exec>
```

At this point, the mobile terminal determines whether the server ID in the unlock command is the same as the recorded server ID. If the server ID in the unlock command is the same as the recorded server ID, the attribute information of the unlock object is restored to the recorded attribute information.

Additionally, the mobile terminal may also receive a management operation command from the server that sends the lock message or from any other server, the management operation command carrying information about the Management Object. Upon receipt of the management operation command, the mobile terminal may determine whether there is a right to execute the management operation command according to the current attribute information of the Management Object. If there is a right to execute the management operation command, the management operation command is executed. If there is no right to execute the management operation command, execution of the management operation command is rejected.

For example, a Date node in the DM tree has been write locked by a first server, but the management operation command received by the mobile terminal is a Replace command for the Date node. It may be seen from Table 4 that modification is not allowed by Write-Lock. Accordingly, a determination may be made that there is no right to execute the Replace command. Here, the right may be determined by the user, and no detailed description is made here.

Embodiment 3

It is assumed that the same locking method as in embodiment 2 is used in the present embodiment, that is, the executable node based method. A lock message carries lock object information and a lock mode. The lock mode is Operation-Lock, and the lock object information includes the path information about the destination node and the lock granularity. The lock granularity includes Device-Lock, Component-Lock, Subtree-Lock and Node-Lock, as well as Package-Lock and Element-Lock. In the present embodiment, it is assumed that the server sending the lock message is an LFC Management Server and the screensaver of the mobile terminal is to be locked. In other words, the structure of the DM tree in the present embodiment may be similar to FIG. 2 except that node X represents a node associated with the LFC information of the mobile terminal and node X5 represents the screensaver in the LFC information. Other nodes, such as X1, X2 or the like, may represent other elements in the LFC information, such as picture or ringtone.

In the present embodiment, descriptions of the Lock node, the ServerID node, the Mode node and the Unlock node are same as in embodiment 2, and detailed descriptions are omitted here. The description of the Granularity node is shown in Table 8.

TABLE 8

| Value | Description |
| --- | --- |
| Device | The whole device is locked |
| Component | The whole component is locked |
| Sub-tree | A sub-tree is locked |
| Data | A node is locked |
| Package | A package is locked |
| Element | An element is locked |

The steps performed in the present embodiment are the same as in embodiment 2 except that the lock mode in the lock message is Operation-Lock and the lock granularity may be Package-Lock or Element-Lock. In the present embodiment, the screensaver of the mobile terminal is to be locked. Here, the package refers to the LFC Package of the mobile terminal, and the element refers to the screensaver. In this manner, once the mobile terminal locks the screensaver according to the lock message, other servers cannot change the current screensaver.

In the present embodiment, the executable node based method is taken as an example to illustrate how to lock the package or element. In practical applications, other methods, such as methods based on indication node, tag or others, may be used to lock the package or element.

Additionally, no matter which method is used to lock the package or element, the lock message may exclude information such as the lock granularity and lock mode. For example, in the present embodiment, node A is an interior node, node X represents a node for LFC information, and node X5 represents the LFC Package which is screensaver. In this manner, when the server issues a lock command, the lock granularity may be represented by the path information about the destination node.

In other words, the lock message sent from the server to the mobile terminal for a package or element may specifically be negotiated by the two parties in advance. The lock message may have no information such as the lock granularity or lock mode. Upon receipt of the lock message, the mobile terminal may determine that the package or element should be locked based on the lock message. In this case, the package or element may be locked directly. If the locked package is an LFC Package, other servers cannot de-activate the current LFC Package of the mobile terminal. If the locked element is an LFC Element, other servers cannot change the value of the current LFC Element in the mobile terminal. Practically, when locking the package or element, the mobile terminal may use a method based on executable node in the present embodiment, or other locking methods, such as methods based on indication node or tag, and no detailed description is made here.

Embodiment 4

The indication node based method is used in the present embodiment. The DM tree of the present embodiment is similar to that of embodiment 2 only differing in that the Lock node and the Unlock node are indication nodes. The descriptions of the Lock node and the Unlock node are shown in Table 9.

TABLE 9

| Node: X/X5/LockOrUnlock | | |
| --- | --- | --- |
| Tree Occurrence | Format | Min. Access Types |
| 1 (One) | Boolean | Get |

In practical applications, the values of the Lock node and the Unlock node are mutually exclusive, and thus may be represented by one node LockOrUnlock. In this manner, the mobile terminal may have a real-time detection of the node LockOrUnlock in the present embodiment.

Figure 5:
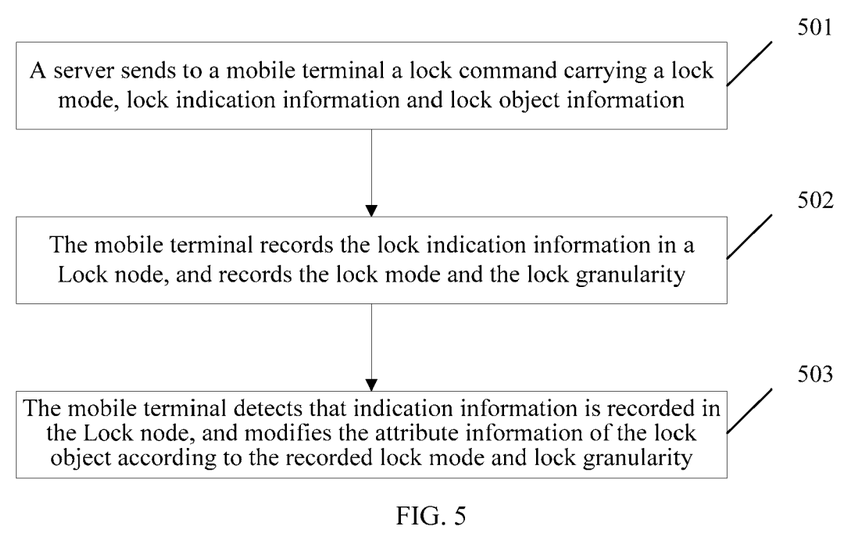
FIG. 5 is a flow chart according to a second embodiment.

FIG. 5 illustrates the flow chart of the present embodiment. As shown in FIG. 5, the method for locking according to the present embodiment includes the following steps.

At Step 501, a server sends a lock message to a mobile terminal, the lock message carrying lock object information, a lock mode and lock indication information. Here, the lock object information may include path information about the destination node and the lock granularity.

The format of the lock message in the present embodiment may be as follows.

```
<Replace>
    <CmdID>1</CmdID>
    <Item>
        <Target>
            <LocURI>./A/X/X5/Lock/Mode</LocURI>
        </Target>
        <Data>Read-Lock</Data>
    </Item>
    <Item>
        <Target>
            <LocURI>./A/X/X5/Lock/Granularity</LocURI>
        </Target>
        <Data>Component<Data>
    </Item>
    <Item>
        <Target>
            <LocURI>./A/X/X5/LockOrUnlock</LocURI>
        </Target>
        <Data>True</Data>
    </Item>
</Replace>
```

Here, "<LocURI>./A/X/X5/Lock/Mode</LocURI>" and "<Data>Read-Lock</Data>" may indicate that the lock mode is Read-Lock. "<LocURI>./A/X/X5/Lock/Granularity</LocURI>" and "<Data>Component<Data>" may indicate that the lock granularity is Component-Lock.<LocURI>./A/X/X5/LockOrUnlock</LocURI>" and <Data>True</Data>" may indicate that the lock indication information. "./A/X" may represent the path information about the destination node.

At step 502, the mobile terminal records the indication information in the Lock node, and records the lock mode and the lock granularity.

As in embodiment 2, because nodes are specifically set in the DM tree to record the lock mode and the lock granularity, the lock mode may be recorded in the Mode node and the lock granularity may be recorded in the Granularity node.

At step 503, the mobile terminal detects that indication information is recorded in the Lock node, and modifies the attribute information of the lock object according to the recorded lock mode and lock granularity.

As in embodiment 2, modification of the attribute information in the present embodiment may be done by modifying the ACL attribute or system attribute of the lock object.

The mobile terminal may also receive an unlock command or a management operation command. The specific procedure is the same as that in embodiment 2 and the detailed description is omitted here.

Embodiment 5

Figure 6:
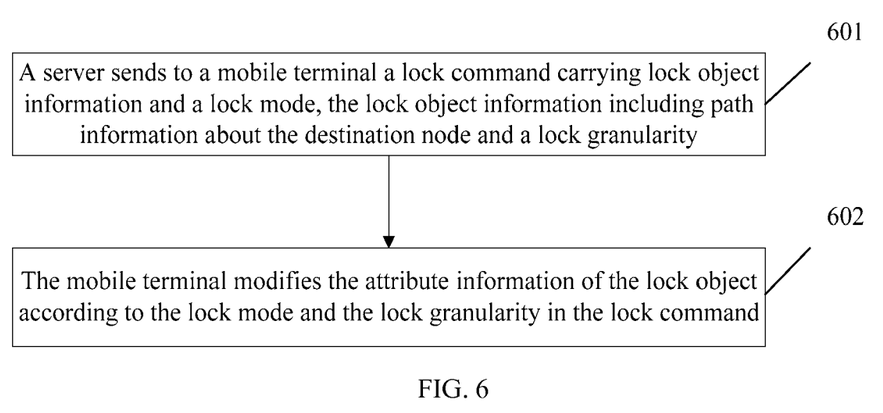
FIG. 6 is a flow chart according to a third embodiment.

In the present embodiment, lock may be done with the tag based method. FIG. 6 illustrates the flow chart of the present embodiment. As shown in FIG. 6, the present embodiment includes the following steps.

At step 601, a server sends a lock message to a mobile terminal, the lock message carrying lock object information and a lock mode. The lock object information may include path information about the destination node and the lock granularity.

In the present embodiment, the lock message may be extended on the basis of the DM protocol, and the format is shown as follows.

```
<Lock>
    <CmdID>1</CmdID>
    <Item>
        <Target>
            <LocURI>./A/X/X5</LocURI>
        </Target>
    </Item>
    <Mode>Read-Lock</Mode>
    <Granularity>Component</Granularity>
</Lock>
```

At step 602, the mobile terminal modifies the attribute information of the lock object according to the lock mode and the lock granularity in the lock message.

As in embodiments 2 and 4, the attribute information may be ACL attribute or system attribute.

Embodiment 6

Based on embodiments 2, 4 and 5, it is assumed that the lock granularity in the lock message of the embodiment is Device-Lock and a lock level is also included. For ease of illustration, descriptions are given below by still taking the DM tree shown in FIG. 2 as example.

It is assumed that the DM tree in the present embodiment is similar to that in FIG. 2. The only difference is that the Lock node includes not only the ServerID node, the Mode node, and the Granularity node, but also the lock level node, that is, the Level node. The descriptions are as shown in Table 10.

TABLE 10

| Node: X/X5/Lock/Level | | |
|---|---|---|
| Tree Occurrence | Format | Min. Access Types |
| 0 or 1 (ZeroOrOne) | Integer | Get |

The value of the Level node may be full lock or partial lock, and the description is shown in Table 11.

TABLE 11

| Value | Description |
|---|---|
| 0 | Partial lock |
| 1 | Full lock |

Alternatively, the value of the Level node may be low-level lock, middle-level lock or high-level lock, and the description is shown in Table 12.

TABLE 12

| Value | Description |
|---|---|
| 0 | low-level lock |
| 1 | middle-level lock |
| 2 | high-level lock |

The steps in the present embodiment are same as in embodiments 2, 4 and 5 only except that the lock granularity is Device-Lock and the lock level is also carried. In this manner, not matter which locking method is used, when receiving a lock message, the mobile terminal may lock the terminal according to the lock granularity and the lock level. In other words, according to the meanings of the various lock levels in embodiment 1, if the lock level is full lock, other functions of the mobile terminal are not usable after the lock command is executed except dialing an emergency call or establishing a session with a specific server. If the lock level is partial lock, other functions of the mobile terminal are not usable after the lock command is executed except answering an incoming call, dialing an emergency call or establishing a session with a specific server. Similarly, if the lock level is low-level lock, other functions of the mobile terminal are not usable except answering an incoming call, dialing an emergency call or establishing a session with a specific server. If the lock level is middle-level lock, other functions of the mobile terminal are not usable except dialing an emergency call or establishing a session with a specific server. If the lock level is high-level lock, other functions of the mobile terminal are not usable except establishing a session with a specific server.

Practically, in order to lock the mobile terminal according to various lock levels, a certain functional program is needed to control the disabling of various functions of the mobile terminal so that the mobile terminal is locked. For example, if the executable node based method is used, the functional program should be associated with the Lock node so that the Lock node may trigger the execution of the functional program. As to the implementation of the functional program, it may be achieved easily by those skilled in the art and detailed description is omitted here.

Furthermore, in practical applications, if the whole terminal is to be locked, the existing Device-Lock procedure may be triggered directly, without using modifying the attribute. After the Device-Lock procedure is performed, all resources or information of the terminal will be shielded completely. For example, only a prompt message is displayed on the screen, such as, "The terminal is locked and can be used only after being unlocked by the server." All keypad entries from the user are invalid. No dialing can be made and no information can be viewed. Furthermore, the lock procedure is self-launched when power on. Even if restart is made by the user, the terminal cannot be used normally. The lock procedure is directed to the terminal. In this case, even if the user changes an SIM card, the lock procedure is still running and the lock operation is still being performed. Such a locking is applied to the scenarios in which the user terminal is lost or being stolen. In this manner, even if the thief changes a new SIM card, the terminal remains unusable. In this way, the user's personal data may avoid being misused.

Embodiment 7

In the present embodiment, a read/write attribute may be used. A read/write attribute <WRMode> may be set for a node in the DM tree, whose value may be read only, hidden or achieved.

The read/write attribute defined in the present embodiment may affect all sub-nodes in the whole sub-tree with the node as its interior node. Specifically, when the read/write attribute of an interior node is archived, the read/write attributes of all sub-nodes may be read only, hidden or archived. When the read/write attribute of an interior node is read only, the read/write attributes of all sub-nodes may be read only, or hidden. When the read/write attribute of an interior node is hidden, the read/write attributes of all sub-nodes can only be hidden.

Here, if the read/write attribute is read only, it is equivalent to Write-Lock. If the read/write attribute is hidden, it is equivalent to Read-Lock.

Figure 7:
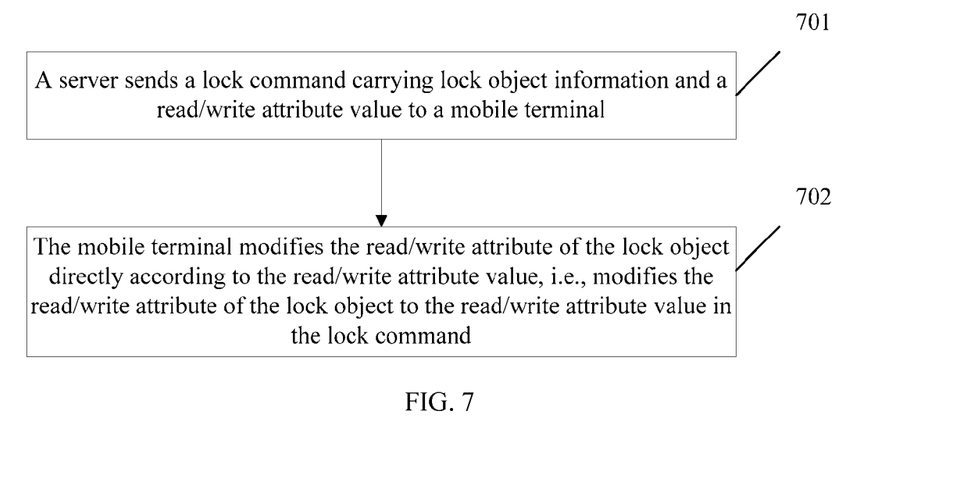
FIG. 7 is a flow chart according to a fourth embodiment.

FIG. 7 shows the flow chart of the present embodiment. As shown in FIG. 7, the method for implementing lock according to the present embodiment includes the following steps.

At step 701, a server sends a lock message to a mobile terminal, the lock message carrying lock object information and a read/write attribute value.

In the present embodiment, a sub-tree whose interior node is the destination node, may be defined as the lock object. Instead of including lock granularity, the lock message may include path information about the destination node. In other words, if the destination node is the interior node of the DM tree, the lock granularity is equivalent to Device-Lock. If the destination node is the interior node of a certain sub-tree, the lock granularity is equivalent to Subtree-Lock. If the destination node is a leaf node, the lock granularity is equivalent to Node-Lock.

If the server intends to lock the Data node and the read/write attribute is set as read only, the format of the lock message according to the embodiment may be shown as follows.

```
<Replace>
  ...
    <Item>
        <Target>
            <LocURI>./X/X4?prop=WRMode</LocURI>
        </Target>
        <Data>Read-Only</Data>
    </Item>
</Replace>
```

The lock message may also carry a server ID. The mobile terminal will record the server ID and the unmodified read/write attribute value so that the unmodified read/write attribute value may be restored in later unlocking. The method is similar to that in embodiment 2 and detailed description is omitted here.

At step 702, the mobile terminal modifies the read/write attribute of the lock object directly according to the read/write attribute value, that is, modifies the read/write attribute of the lock object to the read/write attribute value in the lock message.

Apparently, the attribute information of the lock message in the embodiment is the set read/write attribute.

In practical applications, the above method may be combined with modification of the ACL attribute, so as to implement Exclusive-Lock and Operation-Lock. The method is the same as in embodiment 2, and detailed description is omitted here.

Similar to embodiment 2, upon receipt of a management operation command, the mobile terminal may determine whether there is a right to execute the management operation command according to the current read/write attribute of the Management Object. If there is a right to execute the management operation command, the management operation command is executed. If there is no right to execute the management operation command, execution of the management operation command is rejected.

Embodiment 8

The method according to the embodiment is similar to embodiment 7 except that a lock attribute, rather than a read/write attribute, is set for a node.

In the present embodiment, a lock attribute <Lock> is set for a node, whose value is used to store the sever ID to indicate which server has locked it. If the value is null, it indicates unlocked.

When a server is to lock the lock object, its own server ID is set into the lock attribute via the lock message. At this point, other servers cannot perform any related operation on the node. To unlock the object, the server may modify the lock attribute back to null to indicate unlocked.

In the present embodiment, when the node is being locked, only the server corresponding to the server ID in the lock attribute can modify the lock attribute, and other servers cannot modify the lock attribute. In this manner, the effect of locking may be guaranteed.

Additionally, in the present embodiment, the lock attribute of a node may be defined to affect all sub-nodes in the whole sub-tree whose interior node is the node. Specifically, when the lock attribute of the interior node contains a server ID, all sub-nodes are locked by the same server. When the lock attribute of the interior node is null, the lock attributes of its sub-nodes may be a certain server ID or null.

In practical applications, no matter in which manner the lock is performed, when the mobile terminal is locked, unlocked or executes a management operation command, it may report the execution result to the server. Taking a case for example, a server locks the Logo of a mobile terminal after the mobile terminal performs a Write-Lock on the Logo, the execution result is reported to the server as follows.

```
<Alert>
    <CmdID>2</CmdID>
    <Data>1226</Data>       <!-- Generic Alert -->
    <Correlator>abc123</Correlator>
    <Item>
```

-continued

```
    <Source><LocURI>.LFC/Logo/Operations/Lock</LocURI></Source>
    <Meta>
        <Type              xmlns="syncml:metinf">              x-oma-
application:syncml.lfc.lockresults</Type>
            <Format               xmlns="syncml:metinf">xml</Format>
            <Mark  xmlns="syncml:metinf">critical</Mark>      <!-- Optional -->
    </Meta>
    <Data> 200 </Data>
</Item>
</Alert>
```

Furthermore, when locking is performed on the mobile terminal, the Status node may also be set in the "locked" status, to indicate that the lock object has been locked. Afterwards, when other servers intend to manipulate the mobile terminal, the value of the Status node may be queried first. If it is locked, no management operation command may be sent so as to prevent the operation from going failed and avoid waste of network transmission resources.

Corresponding to the locking method, the invention also provides a system for locking information of the mobile terminal.

Figure 8:
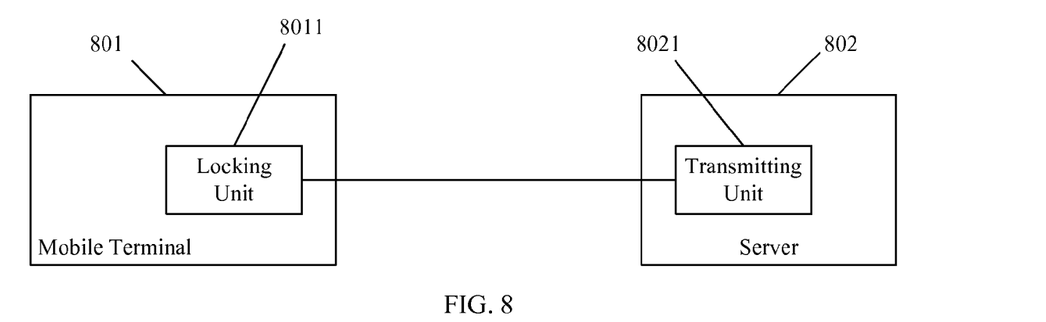
FIG. 8 is a block diagram showing a system for locking information according to the invention.

FIG. 8 is a block diagram showing a system for locking information of a mobile terminal according to an embodiment of the invention. As shown in FIG. 8, the system includes a mobile terminal 801 and a server 802. The mobile terminal 801 at least includes a locking unit 8011 configured to receive a lock message from the server 802 and to modify the attribute information of the lock object. The server 802 at least includes a transmitting unit 8021 configured to transmit a lock message carrying lock object information to the mobile terminal 801.

Here, the server may be a DMS or an LFC Management Server.

The mobile terminal 801 and the server 802 are apparatuses to lock the information of the mobile terminal at the terminal side and at the network side, respectively.

Figure 9:
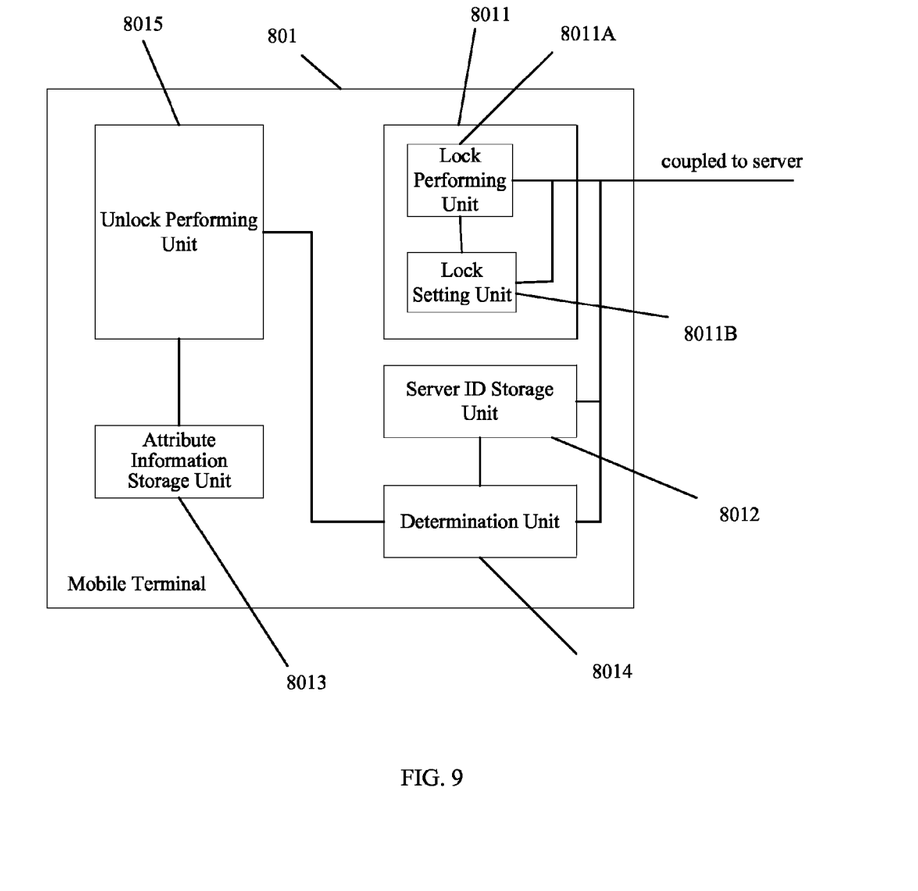
FIG. 9 is a block diagram showing the configuration of the mobile terminal.

As shown in FIG. 9, the locking unit 8011 in the mobile terminal 801 includes a lock performing unit 8011A and a lock setting unit 8011B.

The lock performing unit 8011A is configured to receive the lock message from the server 802, and to modify the attribute information of the lock object according to a lock mode and a lock granularity in the lock setting unit 8011B.

The lock setting unit 8011B is configured to receive the lock command from the server 802, and to extract and record a lock mode and a lock granularity in the lock command.

In practical applications, the mobile terminal 801 may further include a server ID storage unit 8012, an attribute information storage unit 8013, a determination unit 8014, and an unlock performing unit 8015.

The server ID storage unit 8012 is configured to receive the lock command from the server, and to extract and record a server ID in the lock command.

The attribute information storage unit 8013 is configured to store the attribute information of the lock object.

The determination unit 8014 is configured to determine whether a server ID in an unlock command from the server 802 is the same as the server ID in the server ID storage unit 8012, and to output a determination success signal to the unlock performing unit 8015 if the server ID in the unlock command from the server is the same as the server ID in the server ID storage unit.

The unlock performing unit 8015 is configured to restore the attribute information of the lock object to the attribute information stored in the attribute information storage unit 8013.

With the solutions provided in the invention, a server having management capability over a mobile terminal may send a lock message carrying lock object information to the mobile terminal, and the mobile terminal may lock the lock object according to the lock message. In this manner, other servers are prevented from performing operations on the mobile terminal which are prohibited by the server sending the lock message.

The invention has been described above with reference to preferred embodiments, which are not used to limit the scope of the invention. Within the scope of the embodiments of the invention, those skilled in the art may make various changes, substitutions and improvements without departing from the spirit and principle of the invention.

What is claimed is:

1. A method for locking information, comprising:
receiving, by a mobile terminal, a lock message carrying lock object information sent from a server; and
locking, by the mobile terminal, a lock object according to the lock message, the lock object corresponding to the lock object information,
wherein the lock message comprises a server ID; and
after the mobile terminal locks the lock object, recording, by the mobile terminal, the server ID in the lock message;
wherein when the mobile terminal receives an unlock command carrying a server ID and the lock object information,
determining, by the mobile terminal, whether the server ID in the unlock command is the same as the recorded server ID, and
unlocking the lock object if the server ID in the unlock command is the same as the recorded server ID;
wherein the lock object information comprises a lock granularity, the lock granularity being a device lock, the lock message also carrying a lock level for indicating a locking extent;
the lock object is locked according to the lock granularity and the lock level in the lock message;
wherein the lock level comprises partial lock or full lock; or
the lock level comprises low-level lock, middle-level lock or high-level lock;
in the case of low-level lock, other functions of the mobile terminal are not available except answering an incoming call, dialing an emergency call or establishing a session with a specific server;
in the case of middle-level lock, other functions of the mobile terminal are not available except dialing an emergency call or establishing a session with a specific server;
in the case of high-level lock, other functions of the mobile terminal are not available except establishing a session with a specific server.

2. The method according to claim 1, wherein the lock message comprises Lock node triggering information; and
between receiving the lock message and locking the lock object by the mobile terminal, the method further comprises:
triggering, by the Lock node triggering information, a preset Lock node which is an executable node; and
triggering, by the Lock node, the mobile terminal to lock the lock object.

3. The method according to claim 1, wherein the lock message comprises lock indication information; and
between receiving the lock message and locking the lock object by the mobile terminal, the method further comprises:
recording, by the mobile terminal, the lock indication information in a preset Lock node which is an indication node.

4. The method according to claim 1, wherein the lock message further comprises a lock mode, and the lock object information comprises a lock granularity;
when the mobile terminal receives the lock message, the method further comprises: recording, by the mobile terminal, the lock mode and the lock granularity; and
the lock object is locked by modifying attribute information already owned by the lock object according to the recorded lock mode and the lock granularity, the attribute information being Access Control List (ACL) attribute information or system attribute information.

5. The method according to claim 4, wherein the lock mode is Exclusive-Lock, Read-Lock, Write-Lock or Operation-Lock.

6. The method according to claim 4, wherein the lock granularity is Device-Lock, Component-Lock, Subtree-Lock or Node-Lock.

7. The method according to claim 1, wherein the lock message further comprises a lock mode, the lock mode being Operation-Lock, the lock object information comprising a lock granularity, the lock granularity being Package-Lock or Element-Lock, the lock object being a package or an element; and
the lock object is locked by locking the package or the element based on the lock mode and the lock granularity in the lock message.

8. The method according to claim 1, wherein the lock object is a package or an element.

9. The method according to claim 8, wherein the package is a Look and Feel Customization (LFC) Package and the element is an LFC Element.

10. The method according to claim 9, wherein the LFC Package is locked so that the current lock of the LFC Package in the mobile terminal cannot be changed; and
the LFC Element is locked so that the current value of the LFC Element in the mobile terminal cannot be changed.

11. The method according to claim 1, wherein the lock object is locked by modifying attribute information of the lock object;
between receiving the lock message and locking the lock object by the mobile terminal, the method further comprises: storing, by the mobile terminal, the attribute information of the lock object before being modified; and
unlocking is performed by restoring the attribute information of the lock object to the previously stored attribute information before being modified.

12. The method according to claim 4, further comprising:
determining whether there is a right to execute a management operation command carrying information about a Management Object according to the current attribute information of the Management Object when the mobile terminal receives the management operation command,
executing the management operation command if there is a right to execute the management operation command, and
rejecting execution of the management operation command if there is no right to execute the management operation command.

13. An apparatus for locking information, wherein the apparatus is a mobile terminal, and the mobile terminal comprises at least a locking unit configured to receive a lock message carrying lock object information and a server ID sent from a server, and to lock a lock object according to the lock message, the lock object corresponding to the lock object information;
wherein the mobile terminal further comprises a server ID storage unit, a determination unit, and an unlock performing unit,
the server ID storage unit is configured to record the server ID in the lock message;
the determination unit is configured to determine whether a server ID in an unlock command received from a server is the same as the server ID recorded in the server ID storage unit, and to output a determination success signal to the unlock performing unit if the server ID in the unlock command is the same as the server ID recorded in the server ID storage unit; and
the unlock performing unit is configured to unlock the lock object according to lock object information carried in the unlock command;
wherein the lock object information comprises a lock granularity, the lock granularity being a device lock, the lock message also carrying a lock level for indicating a locking extent;
the lock object is locked according to the lock granularity and the lock level in the lock message;
wherein the lock level comprises partial lock or full lock; or the lock level comprises low-level lock, middle-level lock or high-level lock;
in the case of low-level lock, other functions of the mobile terminal are not available except answering an incoming call, dialing an emergency call or establishing a session with a specific server;
in the case of middle-level lock, other functions of the mobile terminal are not available except dialing an emergency call or establishing a session with a specific server;
in the case of high-level lock, other functions of the mobile terminal are not available except establishing a session with a specific server.

14. The apparatus according to claim 13, wherein the locking unit comprises:
a lock setting unit configured to receive the lock message from a server, and to extract and record a lock mode and a lock granularity in the lock message; and
a lock performing unit configured to receive the lock message from the server, and to modify attribute information of the lock object according to the lock mode and the lock granularity in the lock setting unit.

15. The apparatus according to claim 14, wherein the mobile terminal further comprises an attribute information storage unit;
the attribute information storage unit is configured to store the attribute information of the lock object before being modified;
the unlock performing unit is further configured to restore the attribute information of the lock object to the attribute information stored in the attribute information storage unit before being modified.

* * * * *